Dec. 13, 1966   R. K. H. GEBEL   3,291,706
METHOD OF MAKING AN OPTICAL FIBER PHOSPHOR SCREEN
Filed Oct. 8, 1963   3 Sheets-Sheet 1
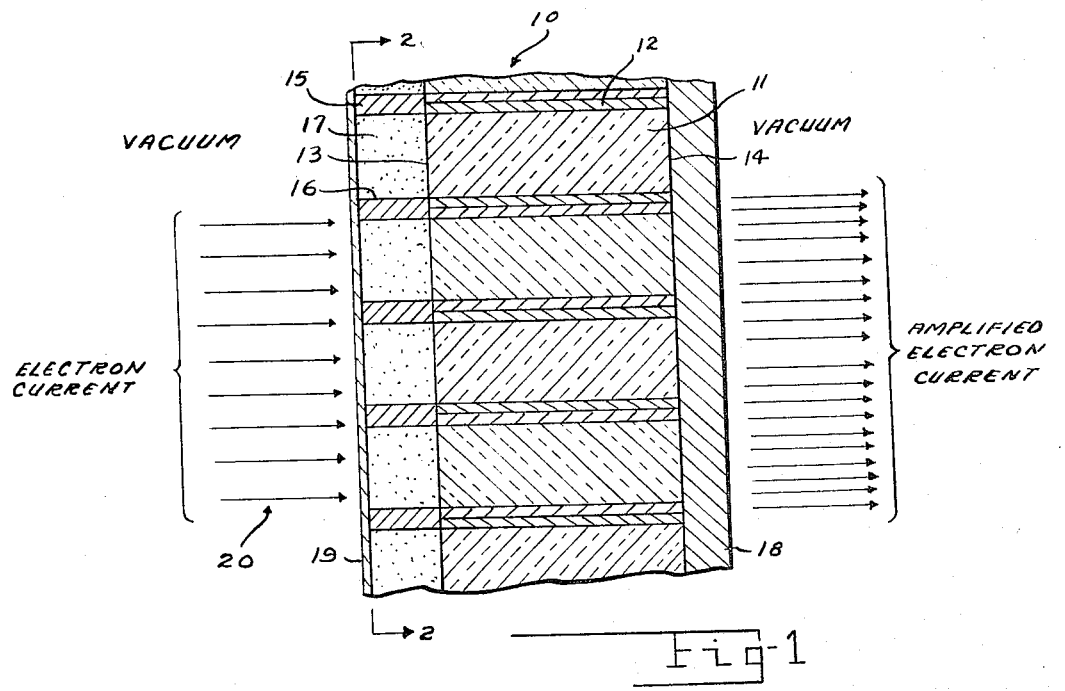
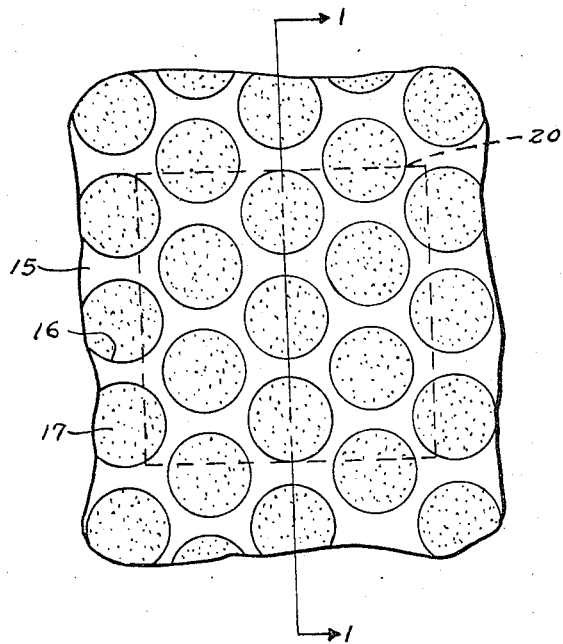
INVENTOR.
R. K. H. GEBEL
BY
ATTORNEY
AGENT Dec. 13, 1966  R. K. H. GEBEL  3,291,706
METHOD OF MAKING AN OPTICAL FIBER PHOSPHOR SCREEN
Filed Oct. 8, 1963  3 Sheets-Sheet 2

INVENTOR.
R. K. H. GEBEL
BY
ATTORNEY
AGENT

United States Patent Office 3,291,706
Patented Dec. 13, 1966

3,291,706
METHOD OF MAKING AN OPTICAL FIBER PHOSPHOR SCREEN
Radames K. H. Gebel, Dayton, Ohio, assignor to the United States of America as represented by the Secretary of the Air Force
Filed Oct. 8, 1963, Ser. No. 314,820
2 Claims. (Cl. 204—15)

The invention described herein may be manufactured and used by or for the United States Government for governmental purposes without payment to me of any royalty thereon.

The purpose of this invention is to provide a method of making optical fiber phosphor screens that is particularly applicable where very small diameter optical fibers are used to give high resolving power.

Briefly, the method comprises applying to one side of an optical fiber plate, in which the fibers have opaque coatings, a coating of a photosensitive resist material of thickness equal to the desired phosphor depth, and exposing the resist material to light passed through the optical fibers from the other side of the plate. The resist image is then developed by dissolving the unexposed resist material leaving small cylinders of exposed resist material covering the ends of the transparent cores of the fibers. A layer of metal is next vacuum deposited from the vapor state over the area containing the resist image to a depth equal to the thickness of the resist material. After this, the resist material and metal deposited thereon are removed by firing and the use of a suitable solvent, leaving a continuous coating of metal over the surface of the plate with voids opposite the ends of the fiber cores. Finally, these voids are filled with a phosphorescent material to complete the phosphor screen. A thin electron pervious metallic reflective coating may be applied over the phosphor side of the screen to reduce light feedback in the conventional manner.

In a variation of the above method, where a thin transparent layer of metal is applied to the fiber optic plate before application of the photosensitive resist material to secure better adherence of the latter to the glass surface, the metallic layer is used as an electrode to permit the electro-deposition of metal into the resist image instead of the vacuum deposition described above.

Figure 3:
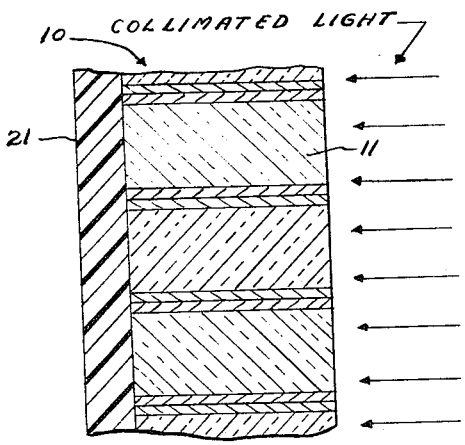
Figure 4:
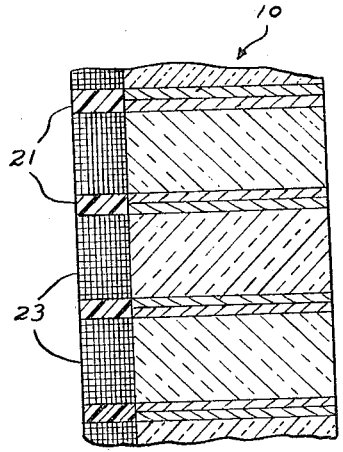
Figure 5:
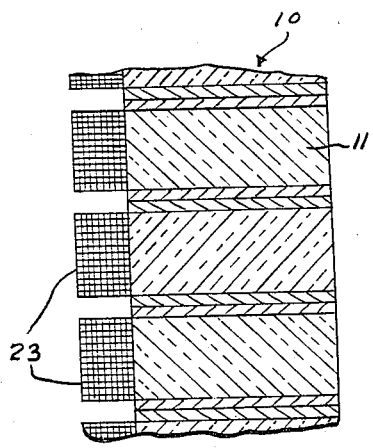
Figure 6:
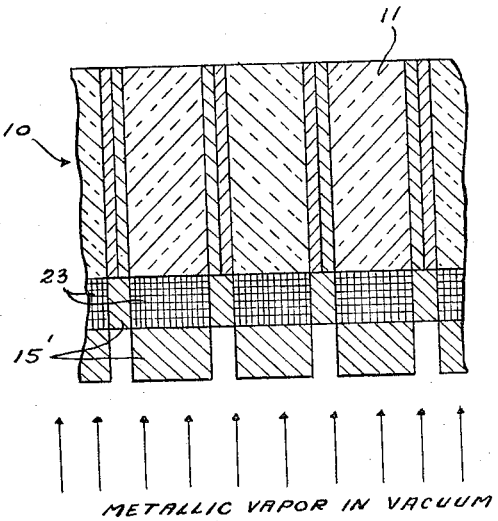
Figure 7:
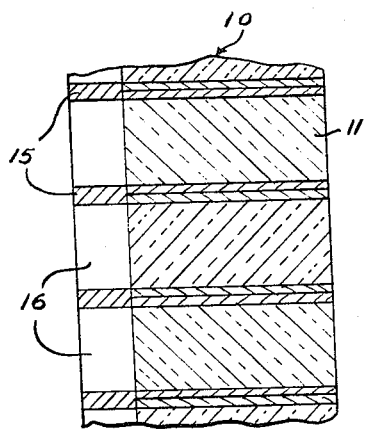
Figure 8:
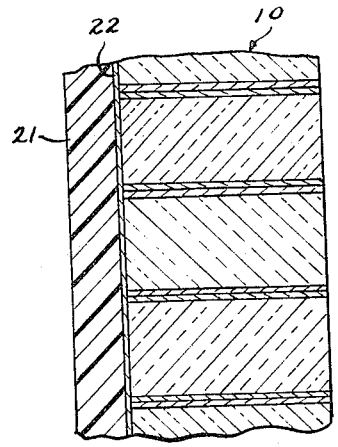
Figure 9:
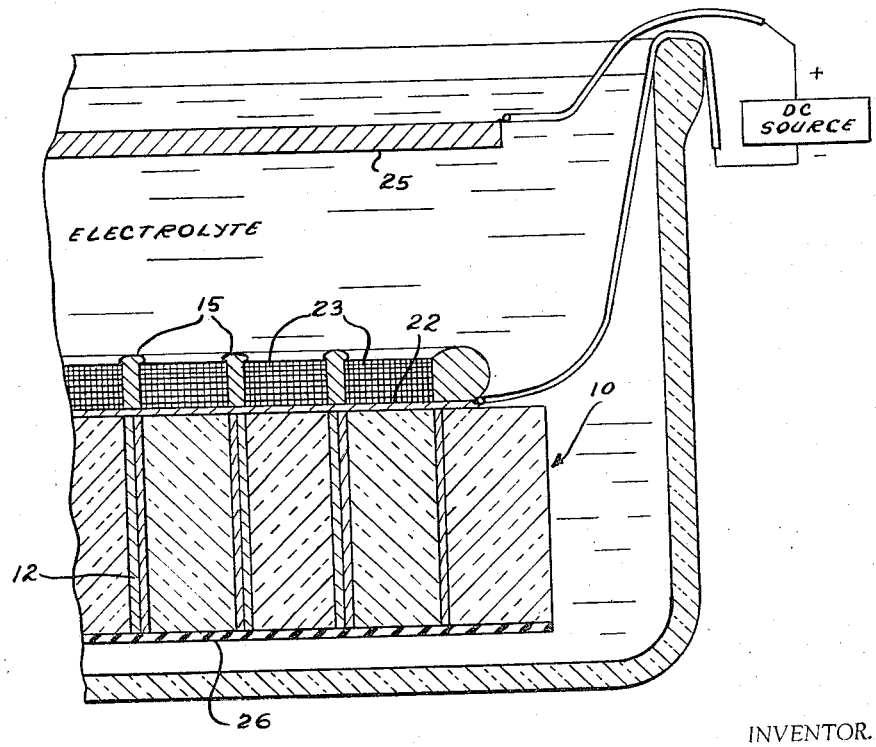

The method will be described in more detail with reference to the accompanying drawings in which FIG. 1 is a cross-section of an electron image intensifier incorporating a phosphor screen produced by the described method, FIG. 2 is a view of the phosphor side of the screen in FIG. 1, FIG. 3 illustrates the screen at the time of the exposure step in the process, FIG. 4 illustrates the exposed screen, FIG. 5 illustrates the screen with the developed resist image, FIG. 6 illustrates the vapor deposition of metal into the resist image, FIG. 7 illustrates the screen before the final step of phosphor application, FIG. 8 illustrates a variation of the process in which a transparent metallic layer is used to improve adherence of the photosensitive resist material to the glass surface of the plate, and FIG. 9 illustrates the electro-deposition of metal into the resist image using the metallic layer of FIG. 8 as an electrode in the process.

Referring to FIGS. 1 and 2, these figures show an electron image intensifier incorporating a phosphor screen made in accordance with the described method. The substrate of the structure is the optical fiber plate 10 made up of optical fibers with opaque coatings bonded together in juxtaposition and with their longitudinal axes parallel. A plate of this type may be cut from an optical fiber rod such as may be obtained commercially with various diameter fibers and various coatings. The fibers normally have a transparent core 11 of glass with a coating 12 which may be metal or an opaque glass or plastic. The sides or surfaces 13 and 14 of the plate should be flat, parallel and normal to the longitudinal axes of the fibers. The side 13 of the plate 10 has a metallic coating 15 which has holes or voids 16 equal in diameter to the transparent fiber cores 11 and concentric therewith. These voids are filled with a phosphorescent material 17 to complete the optical fiber phosphor screen.

The phosphor screen as described above is made into an electron image intensifier by coating the side 14 of plate 10 with a photoemissive material 18. A thin electron previous coating 19 of a suitable metal such as aluminum may be deposited over the phosphor to increase the efficiency of the phosphor screen and prevent light feedback as will be seen later.

The purpose of the intensifier of FIG. 1 is to increase the current density in an electron image with a minimum loss of detail or information in the image. Thus the electron current 20 shown impinging upon the phosphor side of the intensifier may represent an elemental area of an electron image derived from a preceding photocathode. As illustrated this elemental area covers a plurality of optical fibers. The electrons impinging upon the small cylinders of phosphor 17 located in the elemental area cause the release of photons therefrom in a ratio greater than unity. The photons generated in each small cylinder of phosphor travel down the transparent core 11 of the optical fiber to the photoemissive material 18 directly or by reflections from barrier 15, coating 12 and reflective coating 19; or they pass through the coating 19; or they are absorbed by barrier 15 or the opaque coating 12. The coating 19 may be made sufficiently dense to reflect a large part of the photons striking it while still permitting the passage of impinging electrons to the phosphor. Thus, most of the photons generated in the small phosphor cylinder reach the photoemitter where they generate photoelectrons in a ratio greater than unity. The result is an increase in intensity of the electron current representing an elemental area of an electron image. Ideally, the area of the amplified current would be no greater than the area of the impinging current. In an intensifier constructed with a plain glass substrate and a continuous coating of phosphor, the spreading of light in the phosphor and in the substrate causes the area of the photoemitter from which the output current is released to greatly exceed the area of the impinging input current. In an intensifier using an optical fiber phosphor screen, spreading of light in the phosphor is prevented by metallic barrier 15 and in the substrate by the opaque coating 12 on the optical fibers. Therefore, the area of the photoemitter from which the output current is released is much more nearly the same as the area of the impinging current. This conformity increases as the diameter of the optical fibers is reduced so that more fibers are included within the elemental area.

The described method of making the optical fiber phosphor screen, which, as pointed out above, consists essentially of optical fiber plate 10, metallic coating 15 and phosphor fillings 17 as seen in FIG. 1, utilizes a photosensitive resist material. Suitable materials of this type are available commercially from various manufacturers. An example is Kodak Metal-Etch Resist, abbreviated KMER, manufactured by the Eastman Kodak Company, Rochester, New York. The manufacturers provide specific instructions for the use of these materials covering surface preparation, coating, exposure, development and removal of the exposed image. These materials all have the common characteristic that after exposure to light they become resistant to certain chemicals and solvents so that a chemically resistant pattern, called the resist image, may be formed by exposure to light in the desired pattern and development by dissolving the unexposed material.

The optical fiber plate 10, FIG. 1, may be sliced from an optical fiber rod. Such rods, consisting of a large number small diameter coated glass fibers arranged in parallel touching relationship and bonded into a single mass, are commercially available from glass manufacturers. For high resolution phosphor screens the fibers should have a diameter including the coating, lying in the range $10\mu$ to $200\mu$. Also, for the described method, the coatings must be opaque and, as mentioned before, may be of metal or an opaque glass or plastic.

Assuming plate 10 to have been prepared and that surfaces 13 and 14 have been ground and polished preferably to optical flatness, the method comprises the following steps:

(1) *Surface preparation.*—The aim of surface preparation is to insure good adherence of the photosensitive resist material to the surface 13 of the optical fiber plate 10. The specific preparation may vary somewhat with the particular resist material used, however, in general the surface must be thoroughly cleaned by washing in a suitable detergent solution, rinsing and drying. For KMER, satisfactory adherence directly to glass may be obtained by the use of a suitable additive with the resist material, as explained later. A preferred method, however, is either to very slightly etch the surface 13 of plate 10 with HF, or to vacuum deposit on this surface a very thin film of a suitable metal, such as aluminum, to a thickness not exceeding $1\mu$ and preferably of about $0.1\mu$. In some cases it may be advantageous to employ both of these procedures.

(2) *Application of the resist coating.*—The resist material, which is in liquid form, may be applied to the surface 13 of plate 3 by any method that will provide a uniform coat of the desired thickness. The optimum phosphor depth is about $25\mu$ and accordingly the coating of resist material should have this thickness. Spray coating is preferred, using multiple coats if required to give the required total thickness of $25\mu$.

For KMER, the manufacturer recommends for direct coating on a clean glass surface a mixture of 2 parts KMER, 2 parts of KMER thinner and 3 parts of Additive D having the following formula:

Aluminum stearate (tristearate) _____ gr__ 20
KMER _____ cc__ 4.5
Xylene-$C_6H_4(CH_3)_2$ _____ cc__ 100

As stated above, better adherence may be obtained by a slight etching of the glass surface, or the deposition of a thin metallic film on the glass surface, or both. The additive should be omitted in this case and KMER diluted with about equal parts or more of KMER thinner.

The application of the photosensitive resist material must be carried out in the dark or else under safelight conditions as recommended by the manufacturer.

FIG. 3 illustrates the optical fiber plate 10 with the photosensitive resist coating 21 applied directly to the glass, while FIG. 8 illustrates the resist coating 21 applied over a thin metallic film 22.

(3) *Drying.*—For the relatively thick coating of $25\mu$ drying at room temperature for a period of about 12 hours is preferred. However, if a reduction of the drying time is desirable, this may be accomplished by baking at a temperature not exceeding 120° C. Drying must be carried out in the dark or under safelight conditions.

(4) *Exposure.*—The photosensitve resist is exposed by passing light, preferably collimated, through the transparent cores 11 of the optical fibers from the uncoated side, as illustrated in FIG. 3. Preferably, the wavelength of the light used should be in the 400 $m\mu$ region of the spectrum. It will be necessary to determine the optimum exposure time experimentally. This may be done conveniently by preparing a test sample in accordance with steps (1)–(3) and exposing a number of small areas separately, doubling the exposure each time. The test sample is then developed, as explained later, and the resist images in the various area examined to determine the exposure providing the most satisfactory image. FIG. 4 illustrates the exposed photsensitive resist material at 23 and the unexposed material at 21.

(5) *Development.*—Development consists in removing the unexposed resist 21 (FIG. 4) leaving the exposed resist image which, in this case, is composed of small cylinders 23 of exposed resist material covering the ends of the transparent fibers cores 11, as seen in FIG. 5. This may be accomplished by applying a spray of Stoddard Solvent for 2 to 3 minutes followed immediately by a quick spray-rinse of xylene, $C_6H_4(CH_3)_2$, and then a rinse by submersion in benzene, $C_6H_6$. The sprays used should be in the form of a low velocity exceedingly fine mist to avoid physical damage to the resist micro-image.

(6) *Drying.*—After development a short period of drying at room temperature may be advantageous to rigidify the resist image and thus make it more resistant to damage from shock in handling.

(7) *Formation of the metallic coating.*—The metallic coating 15 (FIGS. 1 and 2) may be formed by two methods, as follows:

Method A

A coating of metal 15′ such as aluminum, silver, gold, etc., is vacuum deposited from the vapor state into the resist image, as illustrated in FIG. 6. The thickness of the deposited metal is made equal to the thickness of the resist material 23. The small cylinders 23 of resist material and the metal deposited thereon are then fired off by heating in an oven to 850° F. to 900° F. The loose material is then blown or brushed away and the remaining resist material completely removed with acetone or a commercial paint stripper. This leaves the metal coating 15 with voids 16 opposite the ends of the fiber cores 11, as seen in FIG. 7.

As an alternative to firing, the metal deposited on cylinders 23 may be ground off to expose the resist material which may then be removed by acetone or a suitable stripper as above. This method may be employed when the optical fibers are coated with a plastic that would not withstand the firing temperature.

Method B

This method requires the thin metallic film 22 between the resist material 23 and plate 10, as shown in FIG. 8, and is also applicable where the optical fibers have plastic coatings which would not withstand the firing temperature in Method A. In this method the plate 10 with the developed resist image is placed in an electrolyte and the metallic coating 15 electro-deposited into the resist image using the thin metallic film 22 as one electrode and a suitable anode 25 as the other, as illustrated in FIG. 9. No metal is deposited on the cylinders 23 in this case since the resist material is a good dielectric. After metal has been deposited to the desired thickness, which may be somewhat greater than the thickness of the resist material, the resist material may be removed by acetone or a suitable stripper as in Method A. When the coatings 12 of the optical fibers are of metal, it may be necessary to coat the underside of plate 10 with an insulating material 26 to prevent the deposition of metal at the ends of the coatings. Silver, copper and nickel are suitable metals for electro-deposition.

(8) *Filling the voids with phosphor.*—To complete the optical fiber phosphor screen the voids 16 in metallic coating 15 (FIG. 7) are filled with a phosphorescent material. This may be done by forcing the phosphor in the form of a paste or powder into the voids, or by letting the phosphor settle into the voids from a liquid suspension. The excess phosphor is then ground or polished away flush with metal coating 15 to provide discrete cylinders 17 of a phosphor at the end of the transparent core 11 of each optical fiber as shown in FIGS. 1 and 2. The thin film of metal 19, the purpose of which has already been explained, may then be evaporated over the phosphor side of the screen.

I claim:

1. The method of making an optical fiber phosphor screen comprising the steps of: applying to one side of an optical fiber plate in which the fibers have opaque coatings, a coating of a photosensitive resist material of thickness equal to the desired phosphor depth; exposing said photosensitive resist material to light passed through the optical fibers from the other side of said plate; developing the resist image by removing the unexposed resist material; vacuum depositing from the vapor state a layer of metal over the area containing the resist image to a depth equal to the thickness of the resist material; removing the resist material and metal deposited thereon; and filling the voids left by the removed resist material with a phosphorescent material.

2. The method of making an optical fiber phosphor screen comprising the steps of: vacuum depositing from the vapor state on one side of an optical fiber plate in which the fibers have opaque coatings, a thin highly transparent conductive coating; applying over said conductive coating a coating of a photosensitive resist material; exposing said photosensitive resist material to light passed through the optical fibers from the other side of said plate; developing the resist image by removing the unexposed resist material; electro-depositing metal on said conductive coating where laid bare by removal of the unexposed resist material to a depth equal to the desired phosphor thickness; removing the exposed resist material; and filling the voids left by the removed exposed resist material with a phosphorescent material.

References Cited by the Examiner

UNITED STATES PATENTS

| 2,873,189 | 2/1959 | Evans et al. | 117—33.5 |
| 3,089,956 | 5/1963 | Harder | 117—33.5 |
| 3,226,246 | 12/1965 | Vermeulen et al. | 117—33.5 |
| 3,253,500 | 5/1966 | Hicks | 117—33.3 |

JOHN H. MACK, *Primary Examiner.*

T. TUFARIELLO, *Assistant Examiner.*